United States Patent [19]

Schuchardt

[11] Patent Number: 5,001,277
[45] Date of Patent: Mar. 19, 1991

[54] POLYMERIZATION OF TETRAHYDROFURAN WITH FUMING SULPHURIC ACID AND A COMPLEX ANION COCATALYST

[75] Inventor: Jonathan L. Schuchardt, Exton, Pa.

[73] Assignee: Arco Chemical Technology, Inc., Wilmington, Del.

[21] Appl. No.: 517,961

[22] Filed: Apr. 30, 1990

Related U.S. Application Data

[63] Continuation of Ser. No. 310,188, Feb. 14, 1989, abandoned.

[51] Int. Cl.⁵ .................. C07C 41/02; C07C 41/01
[52] U.S. Cl. ................................ 568/614; 568/617
[58] Field of Search ............................ 568/617, 614

[56] References Cited

U.S. PATENT DOCUMENTS 3,712,930 1/1973 Matsuda et al. .
3,714,266 1/1973 Matsuda et al. .
3,720,719 3/1973 Matsuda et al. .
3,778,480 12/1973 Matsuda et al. .
3,891,715 6/1975 Matsuda et al. .
4,209,641 6/1980 Matsuda et al. .
4,371,713 2/1983 Matsumoto et al. .

*Primary Examiner*—Howard T. Mars
*Attorney, Agent, or Firm*—Lewis J. Young

[57] ABSTRACT

Tetrahydrofuran has been polymerized and copolymerized to form polymers of 1000 to 10,000 molecular weight using fuming sulfuric acid with a cocatalyst selected from salts of Group VA metal halides and superacid salts. The cocatalyst salts may be, for example, $NaPF_6$, $NaSbF_6$, and $LiO_3SCF_3$.

9 Claims, No Drawings

POLYMERIZATION OF TETRAHYDROFURAN WITH FUMING SULPHURIC ACID AND A COMPLEX ANION COCATALYST This is a continuation of application Ser. No. 310,188, filed on Feb. 14, 1989, now abandoned.

BACKGROUND OF THE INVENTION

Polymerization of tetrahydrofuran with cationic initiators has been a topic of considerable academic and commercial interest. Polytetramethylene ether glycols, the product of THF polymerization, are important industrial materials for producing polyurethane and polyester elastomers. Fluorosulfonic acid is probably the initiator predominantly used to make poly(THF) diols.

U.S. Pat. No. 3,712,930 teaches the polymerization of THF with fuming sulfuric acid, a much less costly alternative to fluorosulfonic acid. Unfortunately, polymers of much greater than 1000–1200 molecular weight cannot be produced with fuming sulfuric acid alone. Therefore this catalyst has not been widely used. Cocatalysts have been developed for overcoming the problem of low molecular weight. These include lithium halides (U.S. Pat. No. 4,209,641), Group VIB metal oxides (U.S. Pat. No. 3,720,719), perchloric acid (U.S. Pat. No. 3,714,266), perchlorates (U.S. Pat. No. 3,891,715), and tetrafluoroborate (U.S. Pat. Nos. 3,778,480 and 4,371,713) salts. Polymerization of THF with some of these systems closely resembles a "living" system, i.e., for practical purposes the reactions are free from termination reactions that limit molecular weight when fuming sulfuric acid is used alone. Smaller acid/THF ratios result in higher molecular weight polymers. Molecular weights as high as 7000–8000 have been achieved with perchloric acid and perchlorate salts. A disadvantage of the tetrafluoroborate salts is that they are not very soluble in THF, and thus they are preferably dissolved in fuming sulfuric acid. The perchlorates and perchloric acid have the disadvantage of being potentially explosive.

BRIEF SUMMARY OF THE INVENTION

It has now been found that polytetramethylene ether glycols of high molecular weight (1,000 to 10,000) can be produced by polymerizing tetrahydrofuran with fuming sulfuric acid and a complex anion cocatalyst. The cocatalysts are salts of Group VA metal halides and salts of superacids. Polymerization with these cocatalysts closely resembles a "living" polymerization. In addition, high catalytic efficiency is maintained at the low acid levels used to produce high molecular weight polymers.

DETAILED DESCRIPTION OF THE INVENTION

The polymerization of tetrahydrofuran to high molecular weight polytetramethylene ether glycols (mol. wt. 1,000–10,000) is accomplished between $-20°$ and $+35°$ C., preferably between $-10°$ and $+10°$ C. using fuming sulfuric acid and a cocatalyst selected from the salts of Group VA metal halides or superacid salts. The fuming sulfuric acid may contain 15 to 40 wt-% $SO_3$. The catalyst-cocatalyst system can also be used to prepare copolymers of tetrahydrofuran with other cationically polymerizable monomers, such as epoxides (e.g., ethylene oxide and propylene oxide) and oxetanes. Although the substituted THFs do not polymerize, the substituted oxetanes do. The commercially significant oxetane is 3,3-bis(chloromethyl)oxetane. The copolymers should preferably have greater than 50 mole percent of tetrahydrofuran.

The cocatalysts may be especially, sodium hexafluorophosphate, sodium hexafluoroantimonate, or lithium trifluoromethanesulfonate. The cocatalyst may be used in amounts of from 0.05 to 10.0 wt-% to give higher molecular weight polymers. The preferred amount of cocatalyst is from 0.5 to 1.0 wt-%. The superacid salts useful herein are generally those of acids which have a pKa of less than $-10$. These include various sulfonic acids, perchloric acid, and others which may be found in various lists of pKa values in organic textbooks.

The amount of initiator used depends on the desired molecular weight of the polymers formed. The polymerizations closely resemble a "living" system, so the molecular weights obtained are close to the values calculated from the monomer/initiator ratio. Thus, the molecular weight of the polymer can be controlled. Large THF/acid ratios give high molecular weight polymers. An advantage of the cocatalysts compared with those already known in the Art is that they are easily handled and soluble in THF. In addition to providing a means for achieving molecular weights above 1000 with fuming sulfuric acid, the use of complex anion cocatalysts enhances catalytic efficiency at the low acid levels used to produce high molecular weight polymers. In the absence of a cocatalyst, polymer yields drop steeply at low acid/THF ratios as illustrated below (Example I).

The following examples are meant to further illustrate the invention without limiting the scope.

EXAMPLE I

Polymerization without cocatalyst (not this invention):

A dry, 4-neck round bottom flask was equipped with addition funnel, thermometer, mechanical stirrer and nitrogen inlet. Tetrahydrofuran (100 g, 1.39 mol) was added and cooled to $-10°$ C. with an external bath of dry ice/isopropanol. Fuming sulfuric acid (30 wt-% $SO_3$)(30 g) was added dropwise over 15 min. at $-10°$ C. The mixture was stirred at $-10°$ C. for 1 hr. then at $+10°$ C. for 1 hr. Water(85 g) was carefully added to quench the polymerization. Unreacted THF was removed by distillation and the mixture was then heated to 85° C. for 1 hr. Upon cooling, the lower aqueous phase was removed. The organic phase was diluted with toluene (120 g) and mixed well with calcium hydroxide (1 g) for 15 min. The mixture was stripped in part, filtered to remove inorganic solids, and stripped completely to give colorless poly(THF) diol. Yield: 38 g (38%). Hydroxyl number: 115 mg KOH/g (980 mol. wt.). GPC Mn: 1030. Catalytic efficiency (E = moles polymer/mole $SO_3$) = 34%.

The polymerization was repeated using 10 g of fuming sulfuric acid. The yield was 12%, with a molecular weight of only 1100 (calculated molecular weight was 2685). The need for a cocatalyst with the fuming sulfuric acid for improved yield and higher molecular weight is indicated.

EXAMPLE II

Fuming sulfuric acid (30 wt-% $SO_3$)(10 g) was added dropwise over 15 min. at $-10°$ C. to a mixture of THF (100 g, 1.39 mol) and sodium hexafluorophosphate (1.0 g, 6.0 mmol). The mixture was stirred at $-10°$ C. for 1 hr. and +10° C. for 1 hr prior to water quench and typical workup as described in Example I. Yield: 56 g (56%). Hydroxyl number: 42 mg KOH/g (2680 mol. wt.). GPC Mn: 2920. E = 56%.

Several other polymerizations were run using the same technique but changing the amount of fuming sulfuric acid added. The results are tabulated in Table I.

TABLE I

| Run No. | Fuming Acid(g) | Mn(OH #) | Mn(GPC) | Mn(calcd.)* |
|---|---|---|---|---|
| 1 | 5.0 | — | 6000 | 5350 |
| 2 | 10.0 | 2680 | 2920 | 2685 |
| 3 | 15.0 | 1830 | 1620 | 1800 |
| 4 | 20.0 | 1540 | 1290 | 1350 |
| 5 | 30.0 | 840 | 820 | 907 |

$$*Mn(Calcd) = \frac{No.\ of\ g\ THF \times 80}{No.\ of\ g\ acid \times 0.3} + 18$$

It can be readily seen that the use of 1.0 g of sodium hexafluorophosphate cocatalyst with the acid allows one to produce polymers for which the molecular weights actually obtained are in good agreement with the calculated values. Low acid/THF ratios are used to produce high molecular weight polymers.

EXAMPLE III

Fuming sulfuric acid (30 wt-% SO$_3$)(10 g) was added dropwise over 15 min. at −10° C. to a mixture of THF (100 g, 1.39 mol) and sodium hexafluoroantimonate (1.0 g, 3.9 mmol). The mixture was stirred at −10° C. for 1 hr. and +10° C. for 1 hr prior to water quench and typical workup as described in Example I. Yield: 55 g (55%). Hydroxyl number: 40 mg KOH/g (2800 mol. wt.). GPC Mn: 3340. E = 52%.

EXAMPLE IV

Fuming sulfuric acid (30 wt-% SO$_3$)(10 g) was added dropwise over 15 min. at −10° C. to a mixture of THF (100 g, 1.39 mol) and lithium trifluoromethanesulfonate (10 g, 6.4 mmol). The mixture was stirred at −10° C. for 1 hr. and +10° C. for 1 hr prior to water quench and typical workup as described in Example I. Yield: 36 g (36%). Hydroxyl number: 79 mg KOH/g (1410 mol. wt.). GPC Mn: 1560. E = 68%.

I claim:
1. A method for producing a tetrahydrofuran copolymer comprising:
    (a) mixing greater than 50 mole percent of tetrahydrofuran with a cationically polymerizable monomer selected from the group consisting of epoxides, oxetane, and substituted oxetanes, in the presence of a cocatalyst selected from the group consisting of sodium or lithium salts of Group VA metal halides and sodium or lithium salts of sulfonic acids having a pKa of less than about −10;
    (b) polymerizing the mixture at a temperature between −20° and 35° C. by adding a fuming sulfuric acid catalyst; and
    (c) isolating the resulting copolymer, said copolymer having a number average molecular weight between 1,000 and 10,000.

2. The method of claim 1 wherein said cocatalyst is sodium hexafluorophosphate.

3. The method of claim 1 wherein said cocatalyst is sodium hexafluoroantimonate.

4. The method of claim 1 wherein said cocatalyst is lithium trifluoromethanesulfonate.

5. The method of claim 1 wherein said monomer is propylene oxide.

6. The method of claim 1 wherein said monomer is ethylene oxide.

7. The method of claim 1 wherein said monomer is oxetane or a substituted oxetane.

8. The method of claim 7 wherein said monomer is 3,3-bis(chloromethyl) oxetane.

9. A method for producing a tetrahydrofuran homopolymer comprising:
    (a) mixing tetrahydrofuran and a cocatalyst selected from the group consisting of sodium or lithium salts of Group VA metal halides and sodium or lithium salts of sulfonic acids having a pKa of less than about −10;
    (b) polymerizing the mixture at a temperature between −20° and 35° C. by adding a fuming sulfuric acid catalyst; and
    (c) isolating the resulting homopolymer, said homopolymer having a number average molecular weight between 1,000 and 10,000.

* * * * *